(12) United States Patent
Morimoto et al.

(10) Patent No.: US 10,997,749 B2
(45) Date of Patent: May 4, 2021

(54) INFORMATION PROCESSING APPARATUS

(71) Applicant: FUJI XEROX CO., LTD., Tokyo (JP)

(72) Inventors: Masashi Morimoto, Kanagawa (JP); Toshihiro Iwafuchi, Kanagawa (JP); Noriko Sakai, Kanagawa (JP); Chizuru Ohsawa, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 331 days.

(21) Appl. No.: 16/105,960

(22) Filed: Aug. 20, 2018

(65) Prior Publication Data

US 2019/0228543 A1    Jul. 25, 2019

(30) Foreign Application Priority Data

Jan. 25, 2018    (JP) .............................. JP2018-010337

(51) Int. Cl.
*G06T 7/90*    (2017.01)

(52) U.S. Cl.
CPC ...... *G06T 7/90* (2017.01); *G06T 2207/10024* (2013.01); *G06T 2207/20081* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,142,272 A | * | 8/1992 | Kondo ..................... | G09G 5/02 345/550 |
| 5,335,097 A | * | 8/1994 | Murakami ............. | H04N 1/622 358/515 |
| 5,909,506 A | * | 6/1999 | Goto ......................... | H04N 1/60 382/162 |
| 9,602,685 B2 | | 3/2017 | Miyauchi et al. | |
| 2010/0092036 A1 | * | 4/2010 | Das ...................... | G06K 9/3241 382/103 |
| 2013/0265615 A1 | * | 10/2013 | Nakashima ............... | H04N 1/58 358/3.27 |
| 2016/0042254 A1 | * | 2/2016 | Miyauchi ........... | H04N 1/00336 382/159 |
| 2018/0068426 A1 | * | 3/2018 | Matsunaga ............. | G06T 5/009 |

FOREIGN PATENT DOCUMENTS

| | | |
|---|---|---|
| JP | 2006080746 | 3/2006 |
| JP | 2016038732 | 3/2016 |

* cited by examiner

*Primary Examiner* — Zhiyu Lu
(74) *Attorney, Agent, or Firm* — Volpe Koenig (57) ABSTRACT

An information processing apparatus includes a unit that obtains one or more pairs, each of which is constituted by images before and after correction, a unit that obtains changes in color, caused by the correction, of points in an image for the one or more pairs, a unit that obtains a distribution of the changes for the obtained pairs, and an extracting unit. When an interval having a frequency equal to or larger than a threshold determined for each interval exists at a distance of a tolerance width or more from an interval having a maximum frequency in the distribution, the extracting unit extracts, as learning data to learn a color change caused by the correction, the changes that are included in the interval having the maximum frequency but are not included in the interval having a frequency equal to or larger than the threshold determined for each interval.

14 Claims, 10 Drawing Sheets

INFORMATION PROCESSING APPARATUS

CROSS-REFERENCE TO RELATED APPLICATIONS

This application is based on and claims priority under 35 USC 119 from Japanese Patent Application No. 2018-010337 filed Jan. 25, 2018.

BACKGROUND

(i) Technical Field

The present invention relates to an information processing apparatus.

(ii) Related Art

Users sometimes perform color correction on image data including photographic data in accordance with a purpose of image data usage or user preference. Such color correction is performed by using an image editing application.

However, when color correction is performed on a large amount of image data, manual operation requires a lot of time and effort. Thus, machine learning of color correction using pieces of past image data has been performed in the related art.

SUMMARY

According to an aspect of the invention, there is provided an information processing apparatus including a unit that obtains one or more pairs, each of which is constituted by an image before correction and an image after the correction, a unit that obtains changes in color, caused by the correction, of points in an image for one of the one or more pairs, a unit that obtains a distribution of the changes for the one or more pairs that are obtained, and an extracting unit. When an interval having a frequency equal to or larger than a threshold determined for each interval exists at a distance of a tolerance width or more from an interval having a maximum frequency in the distribution, the extracting unit extracts, as learning data to learn a color change caused by the correction, the changes included in a range of intervals, and the range includes the interval having the maximum frequency but excludes the interval having a frequency equal to or larger than the threshold determined for each interval.

BRIEF DESCRIPTION OF THE DRAWINGS

An exemplary embodiment of the present invention will be described in detail based on the following figures, wherein.

DETAILED DESCRIPTION

Figure 1:
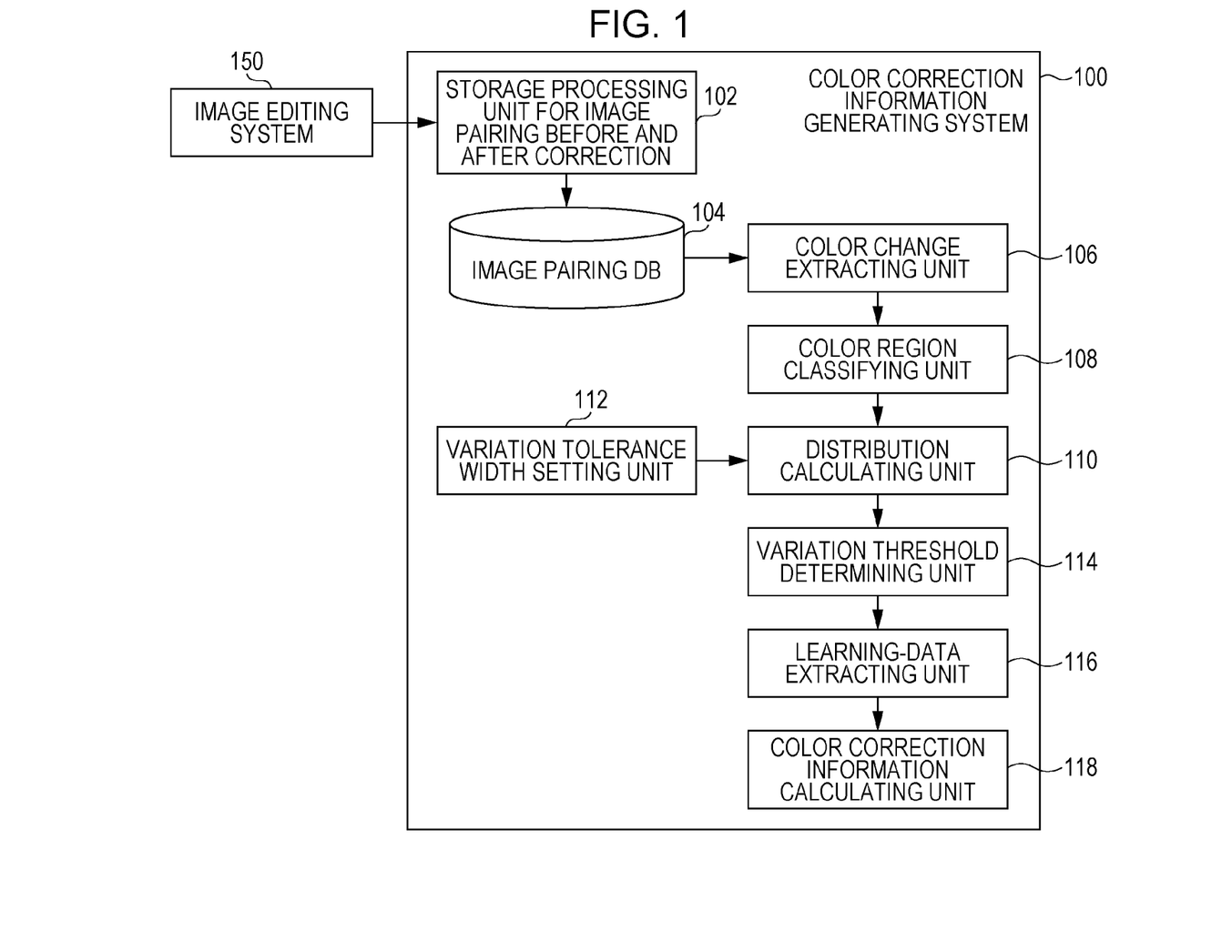
FIG. 1 depicts an example configuration of a color correction information generating system according to an exemplary embodiment.

FIG. 1 depicts an example configuration of a color correction information generating system 100 according to this exemplary embodiment.

The color correction information generating system 100 includes a storage processing unit for image pairing before and after correction 102, an image pairing database (DB) 104, a color change extracting unit 106, a color region classifying unit 108, a distribution calculating unit 110, a variation tolerance width setting unit 112, a variation threshold determining unit 114, a learning-data extracting unit 116, and a color correction information calculating unit 118.

For an image corrected by an image editing system 150, the storage processing unit for image pairing before and after correction 102 stores a pair constituted by an image before the correction (input image) and an image after the correction in the image pairing DB 104. The image editing system 150 mentioned here is a system that performs correction such as color correction on image data. Examples of such a system include Photoshop (registered trademark) provided by Adobe Systems Incorporated. After reading an image before correction by using the image editing system 150, a user operates the image editing system 150 to correct the overall color tone of the image or to correct individual portions that particularly require correction. When the user inputs into the image editing system 150 an instruction indicating that the correction is completed (for example, an instruction to save the image during the editing process), the image editing system 150 provides the storage processing unit for image pairing before and after correction 102 with a pair constituted by the image before the correction, which is read at the start of the editing process, and the image at the time of the correction completion, which is the image after the correction. The storage processing unit for image pairing before and after correction 102 makes an association between the two images constituting the received pair and stores the received pair in the image pairing DB 104.

The image pairing DB 104 is a DB for storing image pairs constituted by images before and after correction.

The color change extracting unit 106 extracts color change information from image pairs, which are stored in the image pairing DB 104 and constituted by images before and after correction. Color change information is information indicating a change in color, caused by correction, of the same pixel in the images constituting an image pair. For example, a piece of color change information is a set containing color coordinates before and after correction, and the set represents the colors of the same pixel in an image before and after correction. Color coordinates represent a point in a predetermined color space (color specification system), such as red, green, and blue (RGB) or Commission Internationale de l'Eclairage (CIE) L*a*b*. A piece of color change information may alternatively be a set containing a color change vector and color coordinates of the starting point or the ending point of the color change vector. A color change vector starts at coordinates representing the color of a pixel in an image before correction and ends at coordinates representing the color of the same pixel in the image after correction. For a pixel that does not change color after correction, the color change vector is a null vector.

The color change extracting unit 106 may extract pieces of color change information from all the pairs stored in the image pairing DB 104 or may extract pieces of color change information from a portion of all the pairs, and the portion may be selected by the user.

The color region classifying unit 108 classifies multiple pieces of color change information, which are extracted by the color change extracting unit 106, according to a criterion based on color regions. A color region is a region formed by dividing a color space. For example, coordinates on each of R, G, and B axes in the RGB color space are grouped into intervals having a predetermined width, and a rectangular region formed by these intervals is an example of a color region. Colors in a color region are regarded as substantially the same. The color correction information calculating unit 118 described below handles a color region as a unit and obtains color correction information for colors included in the color region. The color region classifying unit 108 classifies each of the multiple pieces of color change information, which are extracted by the color change extracting unit 106, according to a color region that includes the color of the starting point or the ending point of the color correction contained in each of the multiple pieces of color change information. The user determines whether the starting point or the ending point is used as the criterion for the classification.

For each of the color regions, the distribution calculating unit 110 calculates a frequency distribution (hereinafter, simply referred to as a distribution) of the pieces of color change information that are associated with the color region. In an example, the distribution calculating unit 110 obtains a direction distribution of color change vectors represented by the pieces of color change information associated with the color region. In another example, the distribution calculating unit 110 obtains a direction distribution and a size (length) distribution of color change vectors. An example of a distribution and a method of obtaining a distribution will be described below in detail.

The variation tolerance width setting unit 112 accepts a setting of a variation tolerance width from the user. A variation tolerance width is a tolerance width that provides a limit within which color corrections are regarded as identical. The variation tolerance width is set, for example, with respect to a direction of a color correction (direction of a color change vector). In this case, if an angle difference between directions of two color corrections is within the variation tolerance width, these color corrections are classified into the same direction group. In addition, the variation tolerance width may be set with respect to a size of a color correction (size of a color change vector). In this case, if a size difference between two color corrections is within the variation tolerance width, these color corrections are classified into the same size group. In the following example, a method of extracting (selecting) the pieces of color change information to be used for learning the color correction information is switched depending on whether the peak of a color correction distribution is located at a distance of the variation tolerance width or less from the average of the color correction distribution. In addition, the width of an interval (bin) in the distribution is determined in accordance with the variation tolerance width in the following example. However, this example will be described for illustration purposes only.

The variation threshold determining unit 114 determines a variation threshold for each interval in a distribution calculated by the distribution calculating unit 110. If an interval in a distribution has a frequency equal to or larger than the variation threshold determined for the interval, the interval is determined to be an interval of variation (badly behaving interval) in a well-behaving distribution. A method of determining a variation threshold will be described below in a specific example.

The learning-data extracting unit 116 uses a distribution obtained by the distribution calculating unit 110 and a variation threshold for each interval, which is determined by the variation threshold determining unit 114, and extracts (selects), from the distribution, intervals to be used for learning color correction information. Then, the learning-data extracting unit 116 extracts pieces of color change information that are included in each of the extracted intervals as learning data for learning color correction information.

The color correction information calculating unit 118 uses the pieces of learning data extracted by the learning-data extracting unit 116 and calculates color correction information to be used for automatic color correction of images. For example, color correction information may be in the form of a look-up table (LUT) representing a correspondence between an input color (color before correction) and an output color (color after correction) in a predetermined color space, such as RGB or L*a*b*. In an automatic color correction operation in such a case, a corrected color of each pixel in an input image is determined by reading a corrected color corresponding to the color of the pixel in the input image from an LUT for the color correction. There are various methods in the related art to generate color correction information from pieces of learning data. The color correction information calculating unit 118 may use any of the methods of the related art.

Figure 2:
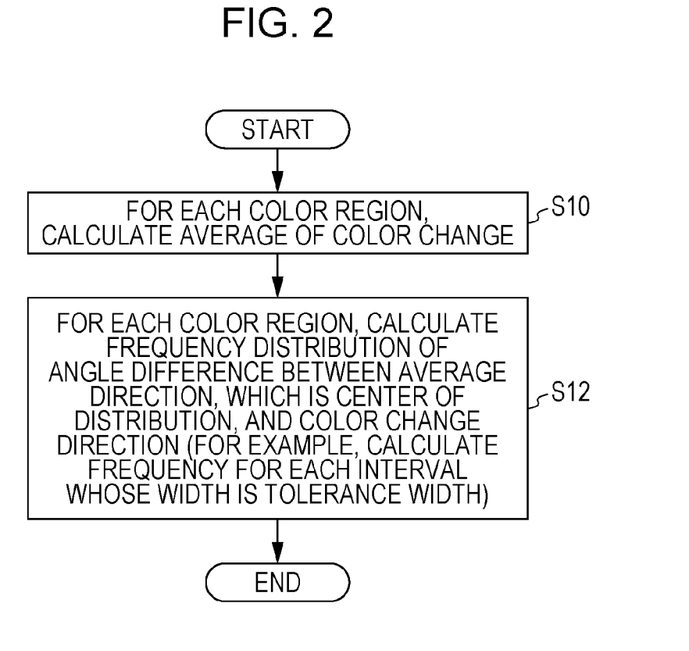
FIG. 2 is a flowchart illustrating procedures performed by a distribution calculating unit.

Next, an example of processing performed by the distribution calculating unit 110 will be described in detail. As depicted in FIG. 2, for each color region, the distribution calculating unit 110 obtains the average of directions of color corrections (directions of color change vectors). The color corrections are represented by pieces of color change information that are associated with each of the color regions (step S10). For this calculation, for example, it is sufficient to calculate the average vector of color change vectors that are represented by pieces of color change information and to obtain the direction of the average vector. The obtained direction is referred to as the average direction. Alternatively, the average of the color coordinates before correction and the average of the color coordinates after correction may be calculated, and the direction of the vector extending from the average of the color coordinates before correction to the average of the color coordinates after correction may be determined to be the average direction. The color coordinates before and after correction are represented by pieces of color change information that are associated with the color region.

Next, for each color region, the distribution calculating unit 110 obtains a frequency distribution (histogram) with respect to angle differences between the average direction, which is the center of distribution, and color change directions (directions of color change vectors) represented by pieces of color change information (step S12). In this example, the width of an interval in the frequency distribution is determined in accordance with the variation tolerance width. For example, the width of each interval may be the same as the variation tolerance width. Alternatively, the interval including the average direction may be set to an interval having the average direction at the center and a width equal to the variation tolerance width on both sides of the center (a direction in which the angle difference is negative and a direction in which the angle difference is positive), the total width being twice the variation tolerance width. Similarly, other intervals may have a width equal to twice the variation tolerance width. The distribution calculating unit 110 classifies pieces of color change information, which are associated with the color region to be processed, according to an angle difference between the average direction and the color change direction represented by a piece of color change information. The number of pieces of color change information that have angle differences included in an interval is counted as the number of pieces of data included in the interval (that is, the frequency for the interval is provided). This processing produces a distribution of angle differences between the average direction and the color change directions represented by the pieces of color change information associated with the color region.

Figure 3:
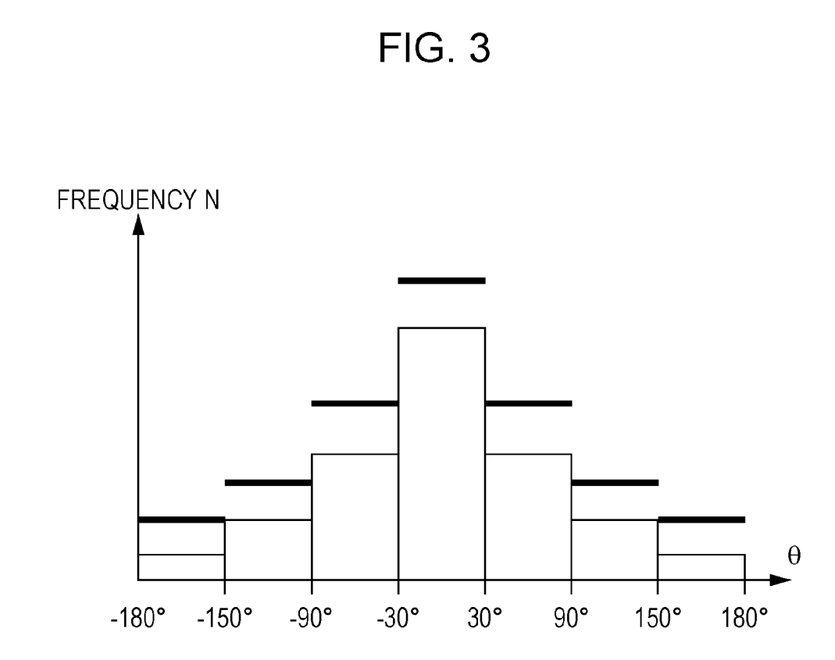
FIG. 3 is a diagram illustrating an example distribution obtained by the distribution calculating unit.

FIG. 3 depicts an example distribution produced in this way. In this example, with the variation tolerance width with respect to the direction set to 30 degrees, a positive angle difference denotes clockwise rotation of a color change direction with respect to the average direction, and a negative angle difference denotes anticlockwise rotation. A column height for an interval such as between −30 degrees and 30 degrees, between 30 degrees and 90 degrees, or the like represents the number of pieces of color change information (that is, a frequency) that are included in the interval. A thick solid horizontal line segment placed above each column represents a variation threshold described below.

Figure 4:
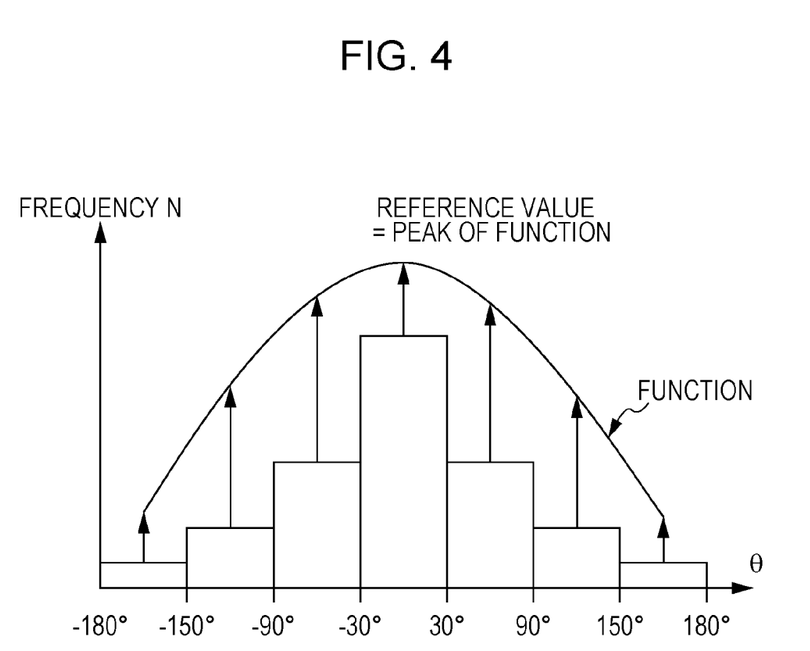
FIG. 4 is a diagram illustrating a method to obtain a variation threshold for each interval.

Next, an example of processing performed by the variation threshold determining unit 114 will be described. In an example, the variation threshold determining unit 114 determines a set of variation thresholds for a distribution, which is calculated by the distribution calculating unit 110 for a color region, by using the distribution itself. For example, a reference value is based on the frequency for the interval including the average of the distribution and calculated by allowing for a margin (for example, adding a fixed value to the frequency or multiplying the frequency by a fixed coefficient), and a variation threshold for each interval is determined using a predetermined function that decreases from the reference value in the positive and negative directions of the distribution. For example, in the example depicted in FIG. 4, calculation is performed as follows. First, a reference value is calculated from the frequency for the interval including the average direction of color change associated with the color region by allowing for a margin based on a predetermined rule. Then, a normal-distribution-like function, whose peak value matches the calculated reference value is derived, and a variation threshold for each interval of angle differences is set to a value of the derived function at the center of each interval. A function used to determine variation thresholds is not limited to the normal-distribution-like function illustrated in FIG. 4. Instead, for example, another function such as a combination of linear functions, each of which decreases from the reference value with the same slope in the positive or negative direction, may be used.

Figure 5:
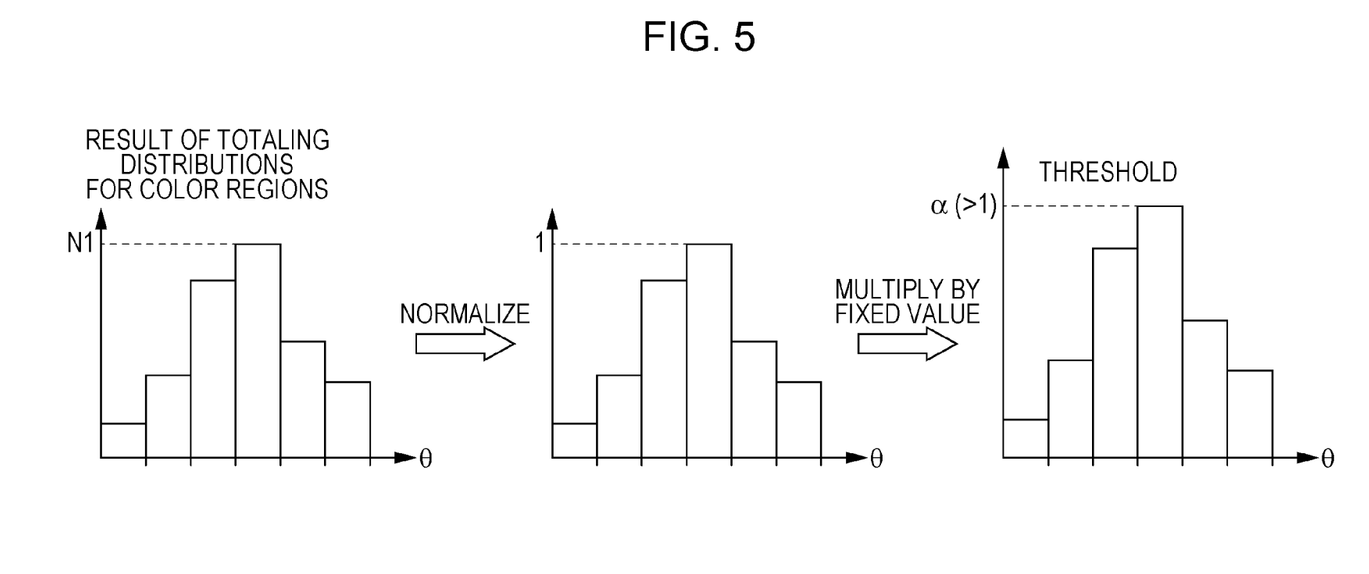
FIG. 5 illustrates another example of the method to obtain the variation threshold for each interval.

In still another example, as illustrated in FIG. 5, a distribution obtained by totaling distributions for color regions in a color space is normalized (that is, a frequency for each interval is reduced by a fixed ratio so that the frequency for the interval including the average is one) and multiplied by a fixed value a, which is one or larger, and a frequency for each interval in the resulting distribution may be set to the variation threshold for the interval. In such a case, a frequency for each interval in the distribution obtained by the distribution calculating unit 110 for a color region is reduced by the ratio for the normalization, and a set of variation thresholds is applied to the distribution subjected to the reduction.

Figure 6:
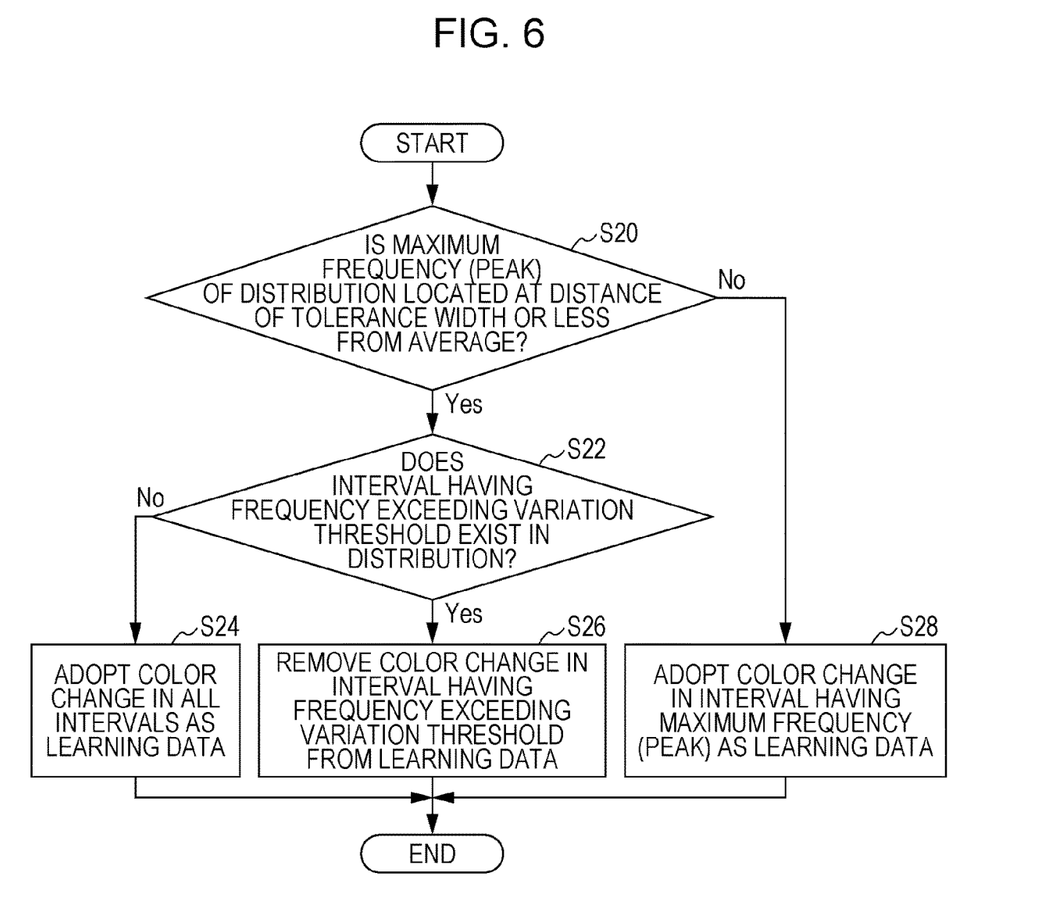
FIG. 6 is a flowchart illustrating procedures performed by a learning-data extracting unit.

Next, with reference to FIG. 6, an example procedure performed by the learning-data extracting unit 116 will be described. In this procedure, the learning-data extracting unit 116 determines whether the maximum frequency (peak) of a distribution obtained by the distribution calculating unit 110 for a color region is located at a distance of a variation tolerance width or less from the average direction of the color change information associated with the color region (step S20). For the distribution illustrated in FIG. 3, in which the center matches the average direction of the color change information associated with the color region and the interval width is set to twice the variation tolerance width, the determination in step S20 is the same as the determination to be made as to whether the interval including the average matches the interval having the maximum frequency (peak). If the interval width of the distribution is less than twice the variation tolerance width, the determination in step S20 may be performed as described in the flowchart.

Figure 7:
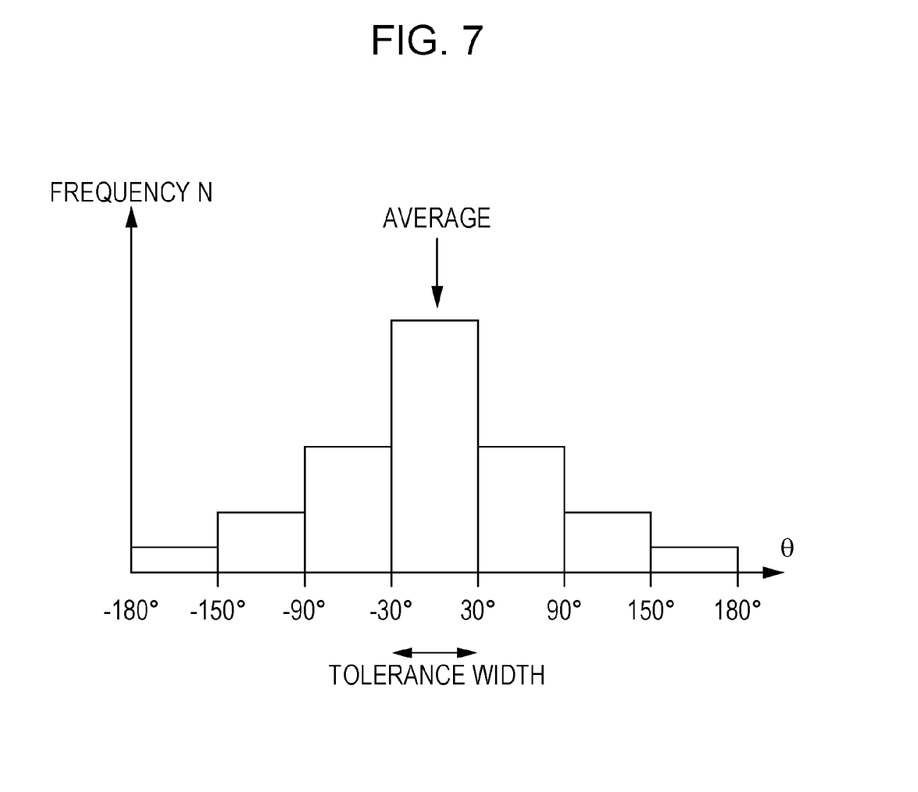
FIG. 7 is a diagram illustrating a well-behaving distribution that has a maximum frequency (peak) close to the average.

If the result of step S20 is Yes, the learning-data extracting unit 116 determines whether an interval having a frequency exceeding the variation threshold corresponding to the interval exists in the distribution (step S22). If the result of this determination is No, as depicted in FIG. 7 for example, the distribution has a frequency that is located in the vicinity of the average located at the center and that is considerably larger than frequencies for other intervals, and a frequency decreases as an interval increases in distance from the average. The distribution has a single peak and resembles the normal distribution. Such a distribution is regarded as a well-behaving distribution. Thus, if the result of step S22 is No, the learning-data extracting unit 116 adopts the pieces of color change information that are included in all the intervals in the distribution as learning data for color correction information associated with the color region (step S24). In the procedure depicted in FIG. 6, if a distribution is well behaving, all the pieces of data included in the distribution are adopted as learning data. This is because the number of pieces of color change information is sometimes not satisfactorily large to perform a learning process because of a small number of image pairs stored in the image pairing DB 104. In contrast, if the number of image pairs used to generate the color correction information is sufficiently large from the statistical viewpoint, only the pieces of color change information that are included in a limited range of intervals around the average may be adopted as learning data in step S24 instead of adopting the pieces of color change information that are included in all the intervals in the distribution.

Figure 8:
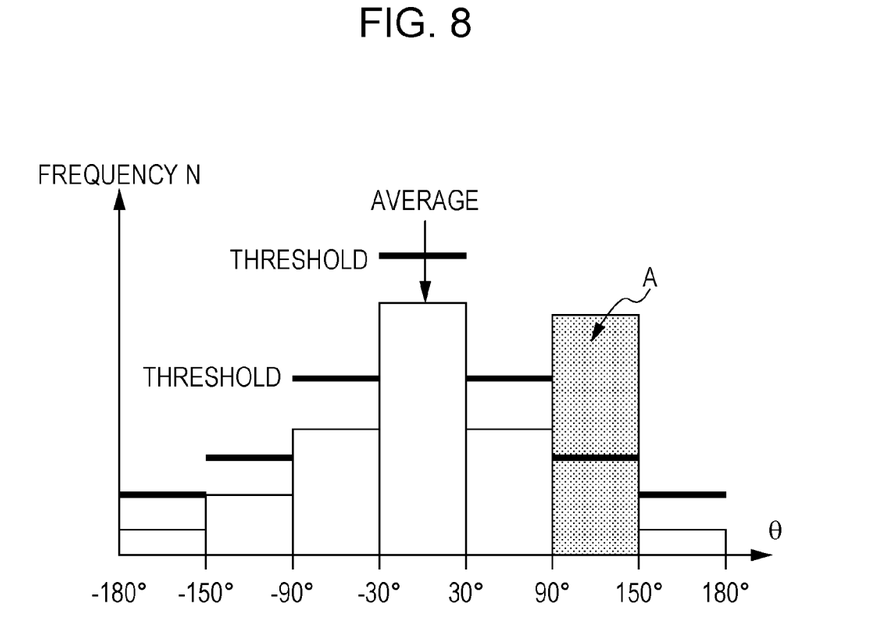
FIG. 8 is a diagram illustrating a distribution that has a maximum frequency (peak) close to the average but has a non-negligible frequency located at a distance of a tolerance width or more from the average, which may cause noise.

If the result of step S22 is Yes, as illustrated by the distribution in FIG. 8, an interval having a large frequency exists at a distance of the variation tolerance width or more from the average of the distribution, and the distribution is not regarded as a well-behaving distribution because of the large frequency. For example, in the example in FIG. 8, the interval A, which is between 90 degrees and 150 degrees, has a frequency exceeding the variation threshold corresponding to the interval A. In the example in FIG. 8, among the pieces of color change information associated with the color region, there are multiple pieces of color change information that are included in the interval A, which is between 90 degrees and 150 degrees from the average, in addition to the pieces of color change information that are included in the intervals close to the average direction. In such a case, if the pieces of color change information that are included in all the intervals in the distribution are used as learning data, the color correction information calculating unit 118 generates color correction information considerably affected by the color change corresponding to the interval A in addition to the color change corresponding to the average direction, which is the larger portion. Such color correction information is likely to be ambiguous and fits well neither the color change information close to the average direction nor the color change information included in the interval A. Thus, if the result of step S22 is Yes, the learning-data extracting unit 116 removes an interval having a frequency equal to or larger than the variation threshold from a range of intervals to be adopted as learning data (step S26). In other words, for example, the learning-data extracting unit 116 adopts, as learning data, pieces of color change information included in intervals in the distribution, which differ from an interval having a frequency equal to or larger than the variation threshold. In accordance with a way to determine the interval width, not only the interval having a frequency equal to or larger than the variation threshold, but also intervals in the vicinity of the interval having a frequency equal to or larger than the variation threshold (that is, intervals located at a distance of a predetermined number of intervals or less from the interval) may be removed from a range of intervals to be adopted as learning data. Thus, the color correction information that is suited to a situation of an average color change for the most part is expected to be obtained by removing from learning data the color change corresponding to the interval that has a noticeable frequency and that is outside the range of intervals corresponding to the average color change.

If the frequency for the interval having a frequency equal to or larger than the variation threshold is comparable to the frequency for the interval having the maximum frequency (that is, the interval including the average direction), that is, the difference between the frequencies of the former and the latter is equal to or smaller than a predetermined threshold, the user may be allowed to determine which interval represents the color region. In such a case, in step S26, the interval that is not selected by the user is removed from a range of intervals to be adopted as learning data.

Figure 9:
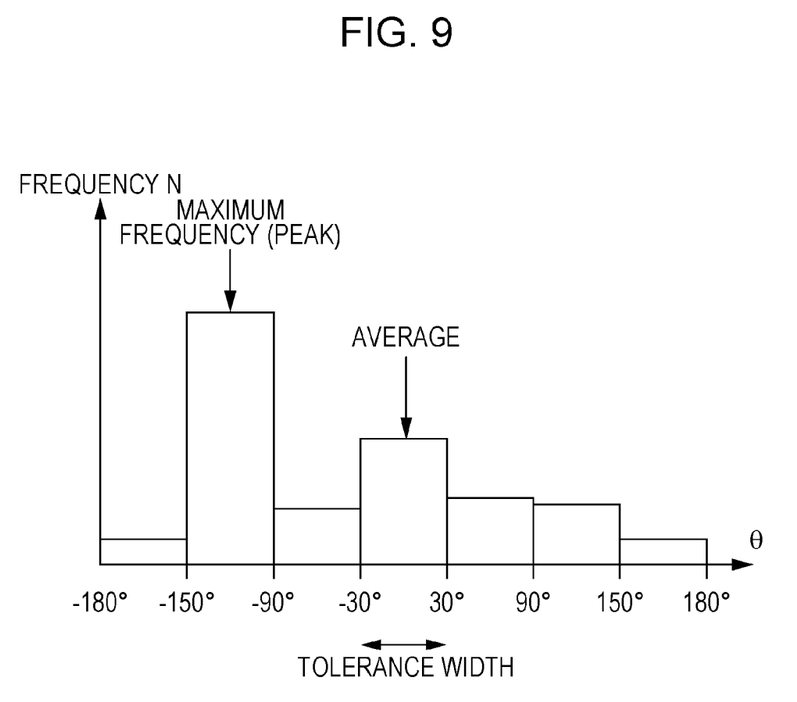
FIG. 9 is a diagram illustrating a distribution that has a maximum frequency (peak) located at a distance of a tolerance width or more from the average.

If the result of step S20 is No, that is, an interval having the maximum frequency (peak) in the distribution is located at a distance of the variation tolerance width or more from the average of the distribution, the learning-data extracting unit 116 adopts, as learning data, pieces of color change information included in the interval having the maximum frequency (peak) (step S28). In such a case, the tendency of color correction associated with the color region is considered to be represented by the maximum frequency (peak) rather than the color change information for the interval including the average, and thus the interval having the maximum frequency (peak) is adopted as an interval from which learning data is extracted. In the example depicted in FIG. 9, the interval between −150 degrees and −90 degrees has the maximum frequency (peak), and thus the color change information included in this interval is adopted as learning data in step S28.

In step S28, not only the interval having the maximum frequency (peak) but also a predetermined number of intervals in the vicinity of the interval having the maximum frequency (peak), for example, may be adopted as intervals from which learning data is extracted. In such a case, the range of intervals adopted in step S28 is narrower (that is, a smaller number of intervals) than the range of intervals from which learning data is extracted in step S24. The distribution in step S24 is better behaving than the distribution in step S28, and thus, in the case of step S24, the range of intervals from which learning data is extracted may be wider without increasing the possibility of generating color correction information incompatible with the peak that is located in the vicinity of the average and that represents the characteristic of the distribution well. In the case of step S24, color correction information that better represents the color correction associated with the color region is obtained by using learning data in a wider range. In the case of step S28, the frequency for the interval having the maximum frequency (peak) may be used as a reference value, and variation thresholds for other intervals may be determined in a manner similar to the manner described in FIG. 4 or FIG. 5. Then, an interval that is in the vicinity of the interval having the maximum frequency and that has a frequency exceeding the variation threshold determined for this interval may be removed from a range of intervals to be adopted as learning data.

Figure 10:
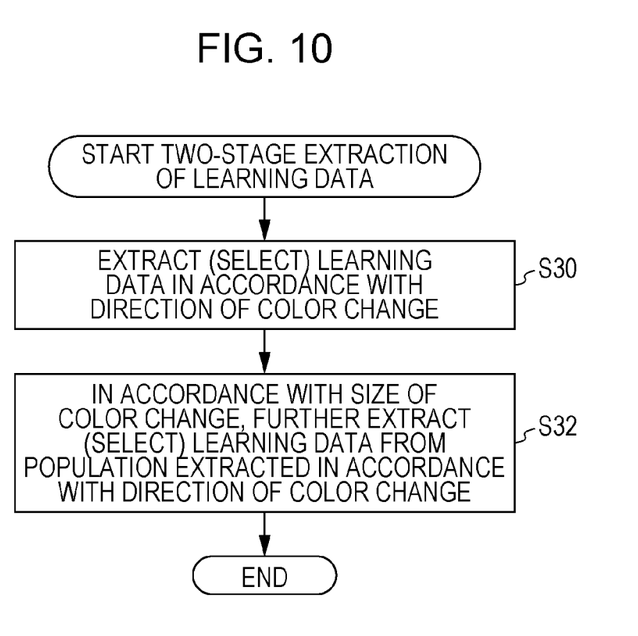
FIG. 10 is a flowchart illustrating procedures in a modification.

Next, a modification will be described. In the modification, as depicted in FIG. 10, the color correction information generating system 100 first extracts (selects) pieces of learning data associated with a color region in accordance with a direction distribution of color change vectors by using a method described above with reference to FIGS. 2 to 9 (step S30). Then, the color correction information generating system 100 extracts pieces of learning data in accordance with the size of the color change vectors from the pieces of learning data extracted in step S30, which are used as a population (step S32).

In step S32, the distribution calculating unit 110 obtains a size distribution of color change vectors, which are represented by the pieces of learning data in the population, in the same manner as used for the extraction based on the directions of color change vectors. The distribution is a distribution whose center matches the average size of the color change vectors in the population. The user is requested to input a variation tolerance width also for the size of color change vectors. The interval width of the distribution may be specified using the variation tolerance width as a reference. Next, the variation threshold determining unit 114 determines a variation threshold for each of the intervals in the distribution in the same manner as described above. Then, the learning-data extracting unit 116 uses the distribution and a set of variation thresholds and extracts pieces of learning data by using the procedure described with reference to FIG. 6.

Thus, in the modification, pieces of learning data representing a color change associated with a color region, in terms of both the direction and the size, are extracted by further restricting the learning data in accordance with the size of color change vectors.

In the exemplary embodiment and the modification described above, an attribute may be associated with each image pair that is constituted by images before and after correction and that is stored in the image pairing DB 104, and the processing performed by the color change extracting unit 106 to the processing performed by the color correction information calculating unit 118 may be performed by selecting image pairs that have attributes specified by the user from the image pairs in the image pairing DB 104.

Attributes used here include an identifier (ID) of a user who performs correction to generate an image pair, a medium (for example, a printed matter or a web page) in which a corrected image in an image pair is used, and a type of scene (for example, a landscape or a portrait) represented by an image pair. The user may specify a combination of multiple attributes (for example, represented by a logical expression), and the processing performed by the color change extracting unit 106 to the processing performed by the color correction information calculating unit 118 may be performed on image pairs selected in terms of the combination of multiple attitudes. These attributes may be input by the user who edits (corrects) an image by using the image editing system 150 at a timing such as the completion of editing.

In the exemplary embodiment and the modification described above, when the color correction information is generated, the color change extracting unit 106 extracts the color change information from image pairs that are constituted by images before and after correction and that are stored in the image pairing DB 104, which is described for illustration purposes only. Instead, at the time point when image editing (correction) by the image editing system 150 is completed, the color change extracting unit 106 may extract the color change information from image pairs constituted by images before and after the correction. Then, the extracted color change information may be stored in a DB, and, when color correction information is generated, the processing performed by the color region classifying unit 108 to the processing performed by the color correction information calculating unit 118 may be performed on the color change information stored in the DB. In such a case, the image pairing DB 104 may be removed. Attributes of the image pairs (for example, as illustrated above, a user ID, a medium, a type of scene, and the like) may be associated with pieces of color change information extracted from the image pairs, and the attributes may be stored in the DB. Then, the pieces of color change information to be used to generate color correction information may be restricted in accordance with such attributes.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a pair unit that obtains one or more pairs, each of the one or more pairs being constituted by an image before correction and an image after the correction;
a color change unit that obtains changes in color, caused by the correction, of points in an image for one of the one or more pairs;
a distribution unit that obtains a distribution of the changes for the one or more pairs that are obtained; and
an extracting unit that, when an interval having a frequency equal to or larger than a threshold determined for each interval exists at a distance of a tolerance width or more from an interval having a maximum frequency in the distribution, extracts, as learning data to learn a color change caused by the correction, the changes included in a range of intervals, the range including the interval having the maximum frequency but excluding the interval having the frequency equal to or larger than the threshold determined for each interval.

2. The information processing apparatus according to claim 1,
wherein, when no interval having the frequency equal to or larger than the threshold exists at a distance of the tolerance width or more from the interval having the maximum frequency, the extracting unit extracts, as the learning data, the changes included in a range of intervals, the range including the interval having the maximum frequency and being wider than the range of intervals from which the changes are extracted in the case where an interval having the frequency equal to or larger than the threshold exists at a distance of the tolerance width or more from the interval having the maximum frequency in the distribution.

3. The information processing apparatus according to claim 1, further comprising:
an average change unit that obtains an average of the changes for the one or more pairs that are obtained; and
a threshold determining unit that determines the threshold for each of the intervals in the distribution in accordance with the maximum frequency.

4. The information processing apparatus according to claim 2, further comprising:
an average change unit that obtains an average of the changes for the one or more pairs that are obtained; and
a threshold determining unit that determines the threshold for each of the intervals in the distribution in accordance with the maximum frequency.

5. The information processing apparatus according to claim 3,
wherein the threshold determining unit uses a predetermined function that has a frequency at the center of the interval having the maximum frequency in the distribution, the frequency being based on the maximum frequency and calculated by allowing for a predetermined margin, the predetermined function decreasing as an interval increases in distance from the interval having the maximum frequency, and determines the threshold for each of the intervals in accordance with values of the predetermined function at the intervals in the distribution.

6. The information processing apparatus according to claim 4,
wherein the threshold determining unit uses a predetermined function that has a frequency at the center of the interval having the maximum frequency in the distribution, the frequency being based on the maximum frequency and calculated by allowing for a predetermined margin, the predetermined function decreasing as an interval increases in distance from the interval having the maximum frequency, and determines the threshold for each of the intervals in accordance with values of the predetermined function at the intervals in the distribution.

7. The information processing apparatus according to claim 1,
wherein the distribution unit that obtains the distribution calculates the distribution for each region set in a color space, and
the extracting unit uses the distribution for the region and extracts the learning data for the color change associated with the region.

8. The information processing apparatus according to claim 2,
   wherein the distribution unit that obtains the distribution calculates the distribution for each region set in a color space, and
   the extracting unit uses the distribution for the region and extracts the learning data for the color change associated with the region.

9. The information processing apparatus according to claim 3,
   wherein the distribution unit that obtains the distribution calculates the distribution for each region set in a color space, and
   the extracting unit uses the distribution for the region and extracts the learning data for the color change associated with the region.

10. The information processing apparatus according to claim 4,
    wherein the distribution unit that obtains the distribution calculates the distribution for each region set in a color space, and
    the extracting unit uses the distribution for the region and extracts the learning data for the color change associated with the region.

11. The information processing apparatus according to claim 5,
    wherein the distribution unit that obtains the distribution calculates the distribution for each region set in a color space, and
    the extracting unit uses the distribution for the region and extracts the learning data for the color change associated with the region.

12. The information processing apparatus according to claim 6,
    wherein the distribution unit that obtains the distribution calculates the distribution for each region set in a color space, and
    the extracting unit uses the distribution for the region and extracts the learning data for the color change associated with the region.

13. The information processing apparatus according to claim 1,
    wherein, when an interval having the frequency equal to or larger than the threshold exists at a distance of the tolerance width or more from the interval having the maximum frequency and a difference between a frequency for the interval having the frequency equal to or larger than the threshold and the maximum frequency is equal to or less than a predetermined tolerance value, the extracting unit extracts, as the learning data, the changes included in a range of intervals, the range including an interval selected by a user and excluding an interval that is not selected by the user from a group including the interval having the maximum frequency and the interval having the frequency equal to or larger than the threshold.

14. The information processing apparatus according to claim 1, further comprising:
    a generation unit that uses the changes extracted by the extracting unit as the learning data and generates color correction information used for color correction of an input image.

\* \* \* \* \*